(12) United States Patent
Cigni

(10) Patent No.: US 9,296,051 B2
(45) Date of Patent: Mar. 29, 2016

(54) MILL AND METHOD OF USE

(75) Inventor: Emanuele Cigni, Florence (IT)

(73) Assignee: Nuovo Pignone S.P.A., Florence (IT)

( * ) Notice: Subject to any disclaimer, the term of this patent is extended or adjusted under 35 U.S.C. 154(b) by 835 days.

(21) Appl. No.: 13/518,771

(22) PCT Filed: Dec. 16, 2010

(86) PCT No.: PCT/EP2010/069978
§ 371 (c)(1),
(2), (4) Date: Aug. 23, 2012

(87) PCT Pub. No.: WO2011/076666
PCT Pub. Date: Jun. 30, 2011

(65) Prior Publication Data
US 2013/0177362 A1      Jul. 11, 2013

(30) Foreign Application Priority Data

Dec. 22, 2009  (IT) .................. CO2009A0073
Jun. 8, 2010   (IT) .................. CO2010A0033
Jul. 30, 2010  (IT) .................. CO2010A0039

(51) Int. Cl.
*B23C 3/00*   (2006.01)
*B23C 3/18*   (2006.01)
(Continued)

(52) U.S. Cl.
CPC ... *B23C 3/00* (2013.01); *B23C 3/18* (2013.01); *B23C 5/02* (2013.01); *B23C 5/10* (2013.01);
(Continued)

(58) Field of Classification Search
CPC ........ B23C 5/04; B23C 5/10; B23C 2210/03; B23C 2210/04; B23C 2210/08; B23C 2210/082; B23C 2215/00; B23C 2220/00; B23C 2220/04; B23C 2220/48; B23C 2220/56; Y10T 409/303752; Y10T 409/303808
USPC ................ 409/131–132; 407/53–54
See application file for complete search history.

(56) References Cited

U.S. PATENT DOCUMENTS 2,334,755 A * 11/1943 Eglinton ............... 433/165
3,058,199 A    10/1962 Cave
(Continued)

FOREIGN PATENT DOCUMENTS

CN     1239450 A    12/1999
CN     2483129 Y    3/2002
(Continued)

OTHER PUBLICATIONS

Machine translation of SU 1348085, printed Feb. 2015.*
(Continued)

*Primary Examiner* — Daniel Howell
(74) *Attorney, Agent, or Firm* — GE Global Patent Operation

(57) ABSTRACT

A method for plunge milling a workpiece. The method includes rotating a cutting head while advancing the cutting head along a direction towards the workpiece; removing material from the workpiece with frontal teeth disposed on a frontal face of the cutting head; bending a tool holder configured to lead the cutting head inside the workpiece; stopping the advancing of the cutting head along the direction towards the workpiece when the cutting head has reached a predetermined depth inside the workpiece; and retrieving while rotating the cutting head from the inside of the workpiece such that side teeth of the cutting head remove material from the inside of the workpiece due to the bending of the tool holder.

34 Claims, 13 Drawing Sheets

(51) Int. Cl.
*B23C 5/10* (2006.01)
*B23C 5/02* (2006.01)
*B23P 15/34* (2006.01)

(52) U.S. Cl.
CPC ............ *B23P 15/34* (2013.01); *B23C 2210/02* (2013.01); *B23C 2210/084* (2013.01); *B23C 2215/44* (2013.01); *B23C 2220/56* (2013.01); *Y10T 407/1946* (2015.01); *Y10T 409/303416* (2015.01); *Y10T 409/303808* (2015.01)

(56) References Cited

U.S. PATENT DOCUMENTS

| | | | | |
|---|---|---|---|---|
| 3,912,414 | A | * | 10/1975 | Fukura et al. ............... 408/144 |
| 4,394,779 | A | | 7/1983 | Hansen |
| 6,007,281 | A | * | 12/1999 | Eriksson et al. ............ 409/132 |
| 7,125,210 | B2 | | 10/2006 | Kolker et al. |
| 7,476,064 | B2 | * | 1/2009 | Ishii ............................. 407/119 |
| 7,784,181 | B2 | * | 8/2010 | Nocciolini et al. ........ 29/889.23 |
| 2005/0123363 | A1 | | 6/2005 | Ahrnkiel |
| 2006/0104736 | A1 | | 5/2006 | Satran |
| 2008/0206000 | A1 | | 8/2008 | Sasu |
| 2008/0253846 | A1 | * | 10/2008 | Ni et al. ......................... 407/34 |
| 2010/0175256 | A1 | | 7/2010 | Zhu |
| 2011/0027025 | A1 | * | 2/2011 | Horiike et al. ................. 407/47 |

FOREIGN PATENT DOCUMENTS

| | | | |
|---|---|---|---|
| DE | 3308478 | A1 | 9/1983 |
| DE | 10318948 | A1 | 8/2004 |
| EP | 1010486 | A1 | 6/2000 |
| EP | 2206577 | A1 | 7/2010 |
| JP | 56132030 | A | 10/1981 |
| JP | 56132030 | U * | 10/1981 |
| JP | 59188115 | A | 10/1984 |
| JP | 59188115 | U * | 10/1984 |
| JP | 02083108 | A * | 3/1990 |
| JP | 11309618 | A * | 11/1999 |
| JP | 2002036018 | A * | 2/2002 |
| SU | 963718 | A * | 10/1982 |
| SU | 1306654 | A * | 4/1987 |
| SU | 1348085 | A * | 10/1987 |
| WO | WO 2004020132 | A1 * | 3/2004 |
| WO | 2004069457 | A1 | 8/2004 |

OTHER PUBLICATIONS

Bending, Deflection and Stress Equations Calculator for Cantilevered Beam with one Load Applied at End, Printed from EngineersEdge.com website, 2 pages, printed Jul. 2015.*
Unofficial English Translation of Chinese Office Action and Search Report issued in connection with corresponding CN Application No. 201080064564.1 on Oct. 31, 2014.
Search Report and Written Opinion from corresponding PCT Application No. PCT/EP2010/069978, dated Feb. 18, 2011.
Search Report and Written Opinion for corresponding Italian Application No. CO2009A000073, dated Apr. 27, 2010.
Search Report and Written Opinion for corresponding Italian Application No. CO2010A000033, dated Dec. 21, 2010.
Search Report and Written Opinion for corresponding Italian Application No. CO2010A000039, dated Feb. 10, 2011.
McNamara, William. "Getting Down", Cutting Tool Engineering; 55(10): Oct. 2003, two pages.

* cited by examiner

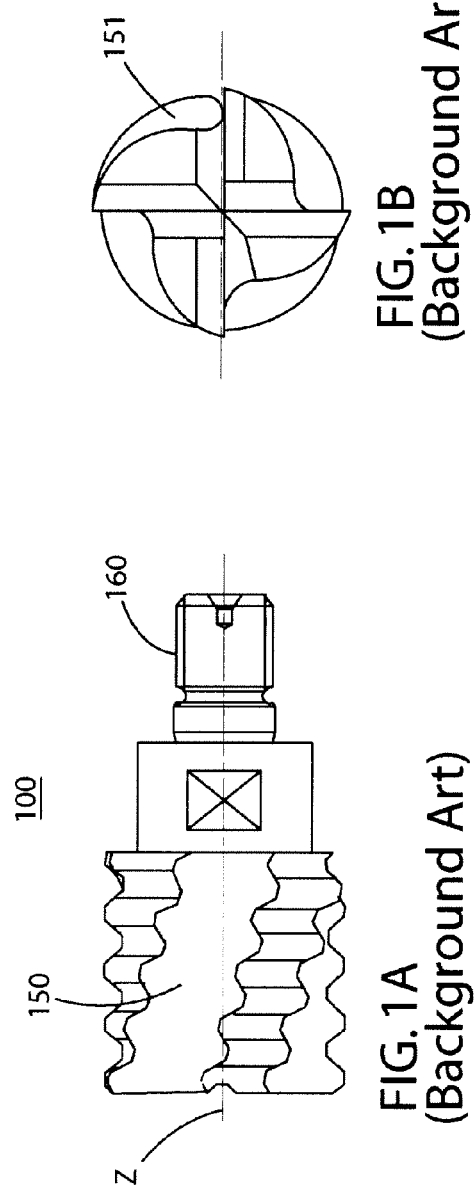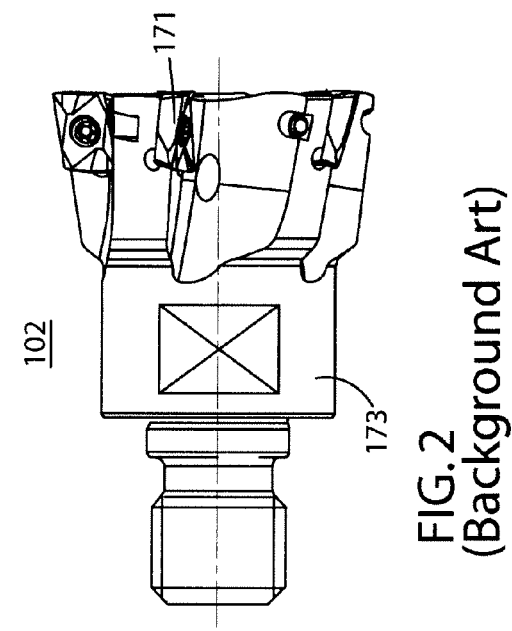
FIG. 1A (Background Art)
FIG. 1B (Background Art)
FIG. 2 (Background Art)

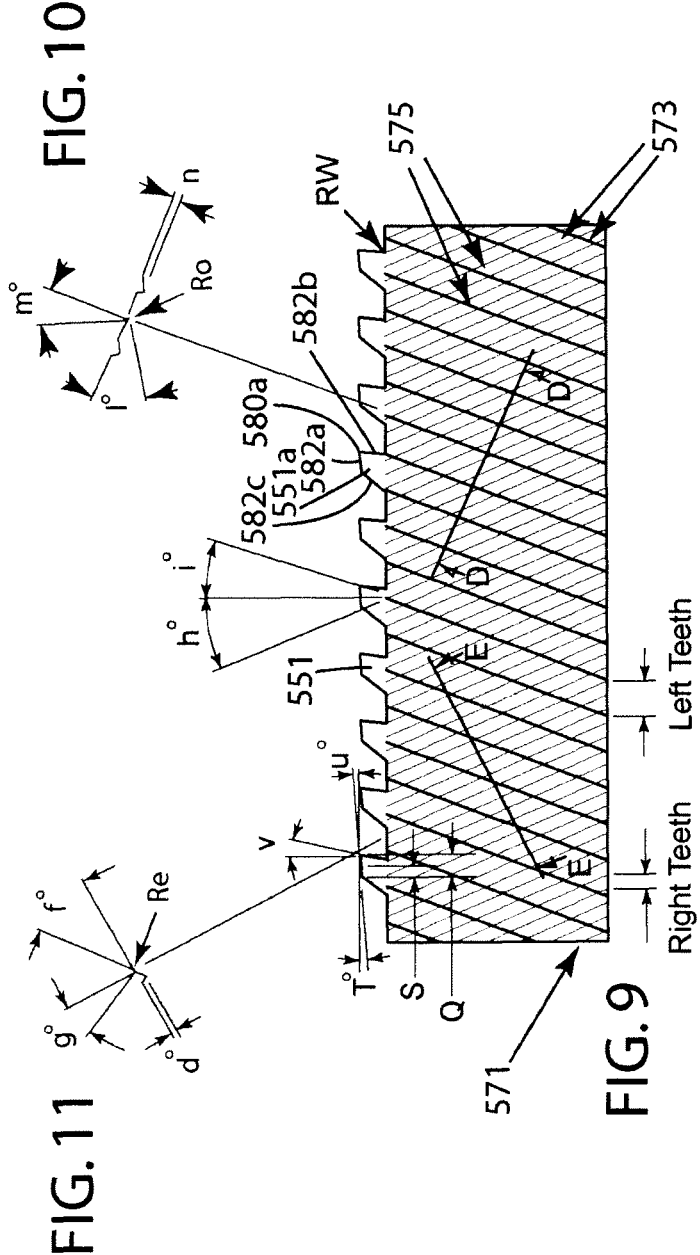

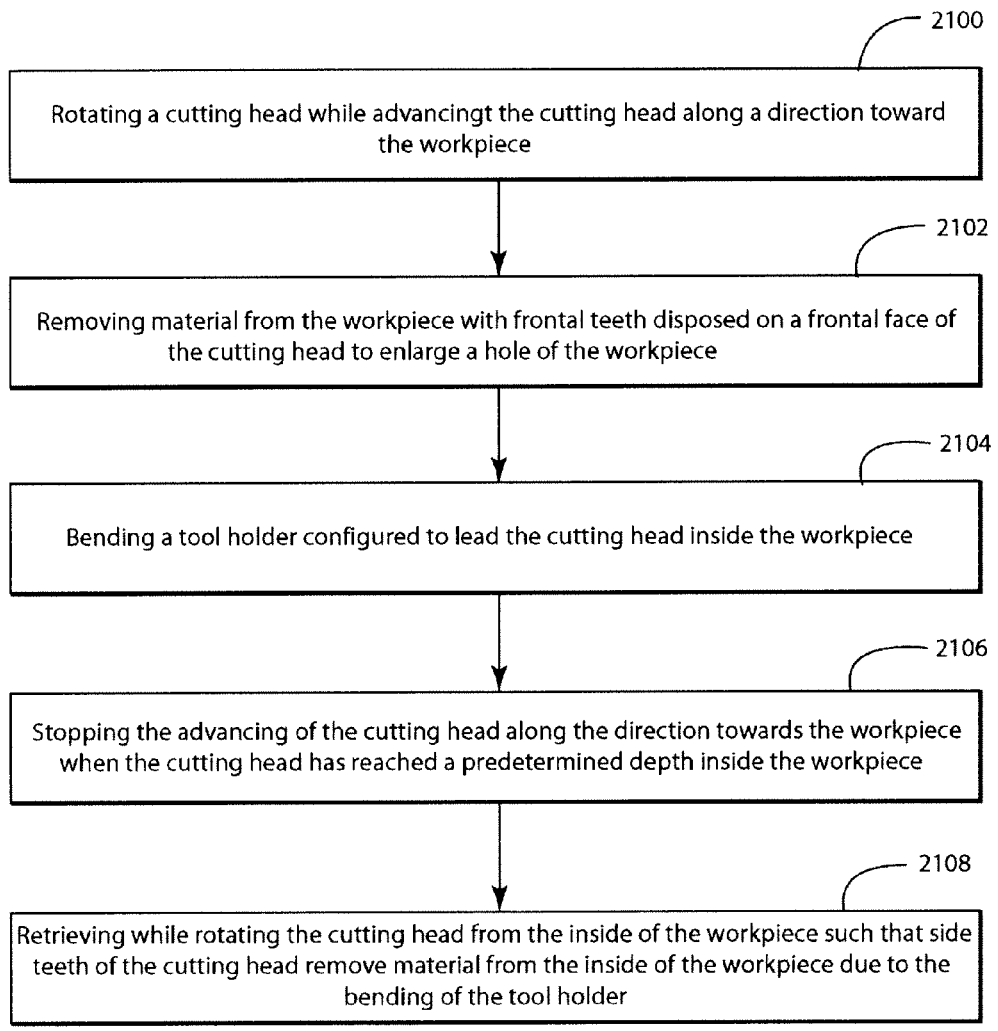

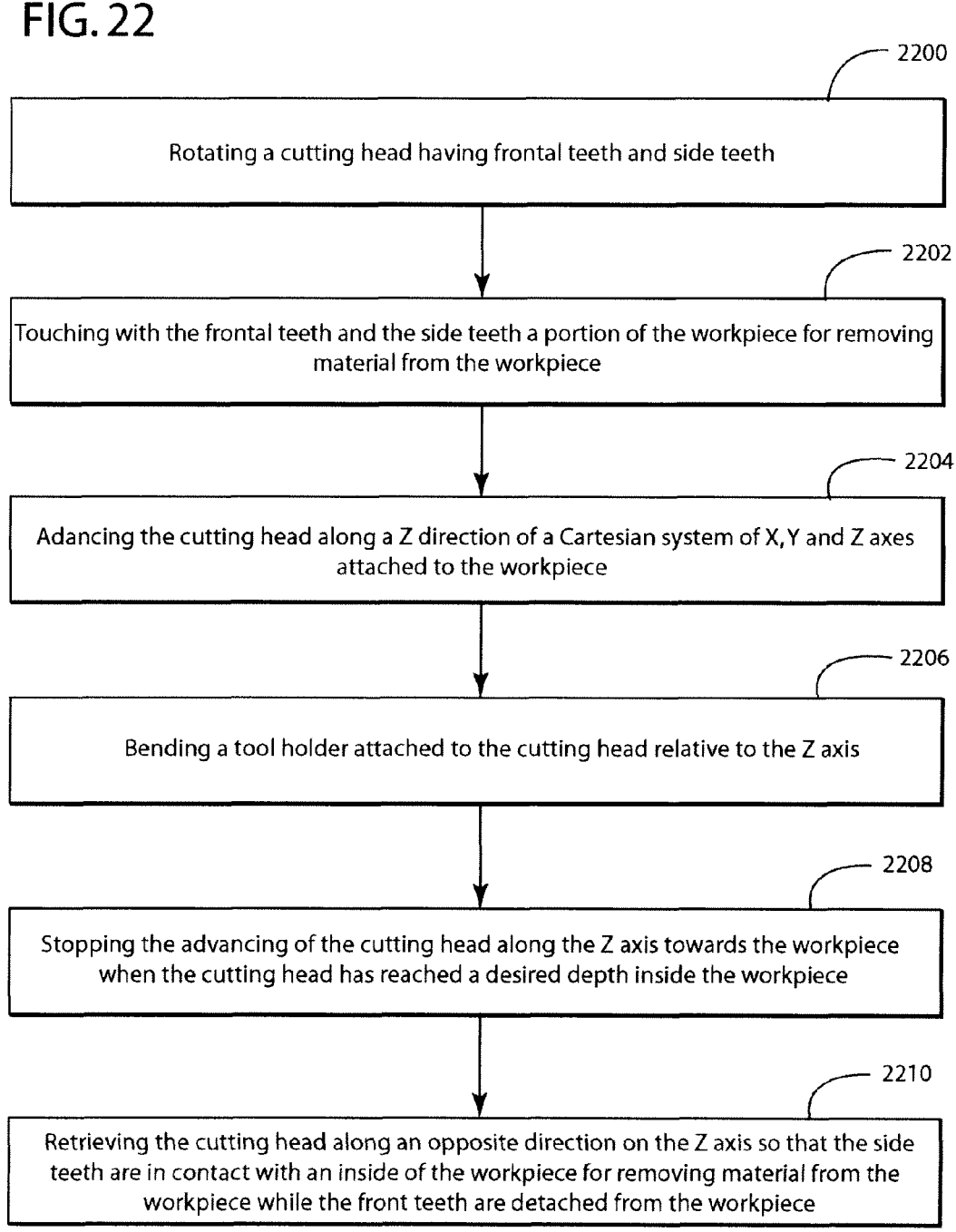

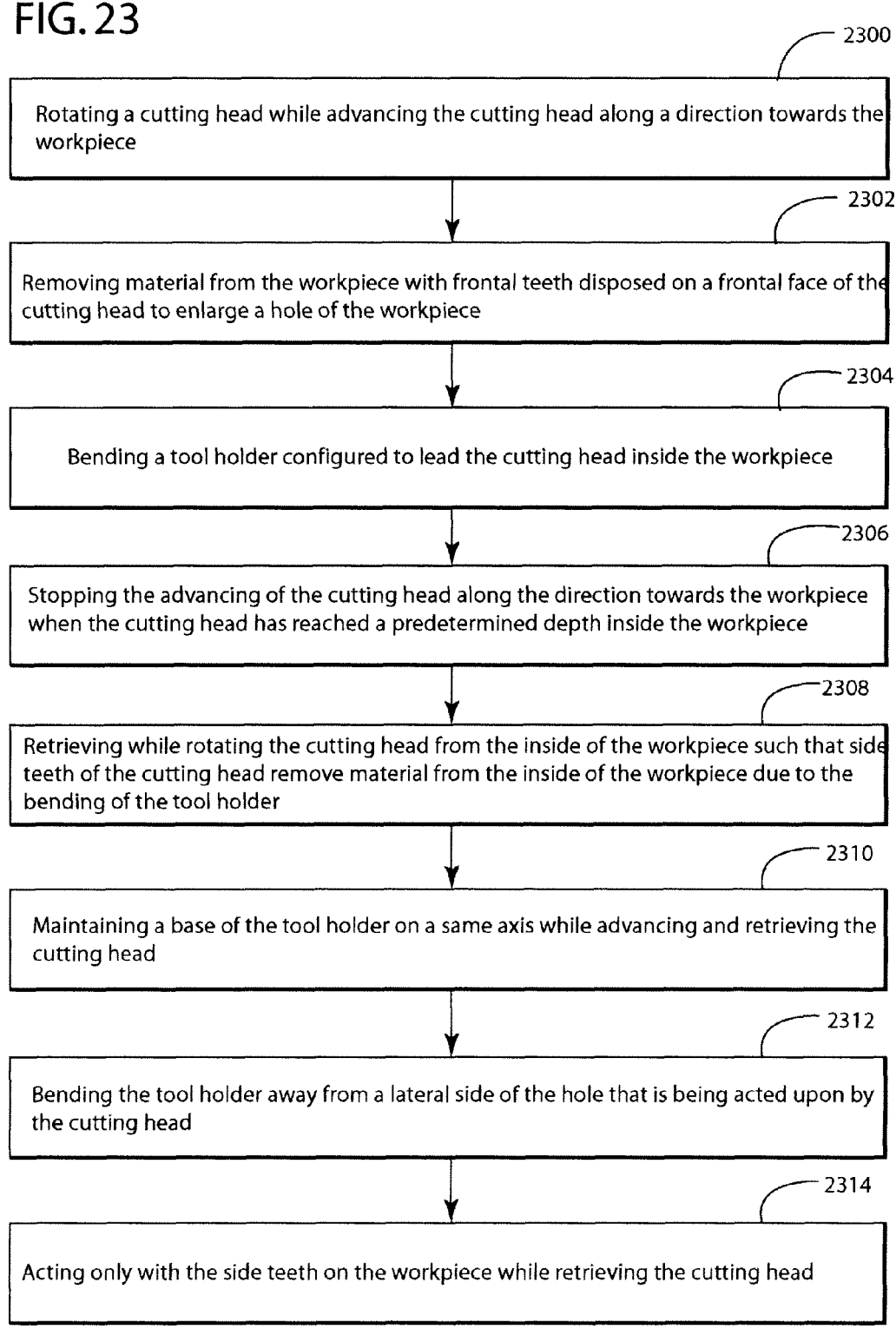

MILL AND METHOD OF USE

CROSS REFERENCE TO RELATED APPLICATIONS

This is a national stage application under 35 U.S.C. §371 (c) of prior-filed, co-pending PCT patent application serial number PCT/EP2010/069978, filed on Dec. 16, 2010, which claims priority to Italian Patent Application Serial No. CO2009A000073, filed on Dec. 22, 2009, Italian Patent Application Serial No. CO2010A000033, filed on Jun. 8, 2010, and Italian Patent Application Serial No. CO2009A000039, filed on Jul. 30, 2010, the entire contents of which are incorporated herein by reference.

BACKGROUND OF THE INVENTION

The disclosure is directed to a mill, such as a mill used to perform a Z-axis plunging operation, and a method of using the mill to perform the plunging operation.

It is known to use a compressor in the oil and gas industry. For example, the compressor can be used to pressurize oil or gas flowing through the pipeline. It is also known to use an impeller blade with a relatively complex geometry in the compressor, to achieve desired flow characteristics of the fluid in the compressor. A known mill can be used to manufacture the impeller blade by translating the mill along an X-axis and a Y-axis while plunging the mill along the Z-axis. This is referred to as a Z-axis plunging operation or plunge milling.

FIG. 1A is a side view of a known high speed steel (HSS) mill 100, and FIG. 1B is a frontal view of the known mill 100. The known mill 100 includes top cutting teeth 151 on a top surface of a cutting head 150, which is connected to a shaft 160 that extends along the Z-axis. By this arrangement, the cutting head 150 rotates as the shaft 160 is rotated by a motor around the Z-axis. Rotation of the cutting head 150 results in the removal of material, such as from an impeller blade, by the top cutting teeth 151. FIG. 2 shows a known insert mill 102 having teeth 171 that are attached with screws to a shaft 173.

Using the known mills 100 and 102 to manufacture the impeller blade can provide some advantages compared to manufacturing the blade by other methods. For example, the known mills 100 and 102 can be used to manufacture geometries that would be difficult or impossible to manufacture by other methods. Further, the known mills 100 and 102 can remove a relative large volume of material in a relatively short period of time.

There are disadvantages, however, resulting from using the known mills 100 and 102. For example, when an arrangement that includes the known mills 100 or 102 has a relatively large kit length, for example, the length from the head of the mill to the motor, the known mills 100 and 102 can deflect or vibrato during material removal from the impeller blade. This deflection can result in the blade having inaccurate geometries. The deflection can also result in an unsatisfactory finish on a surface of the impeller blade, as well as excessive noise during manufacturing of the blade.

BRIEF SUMMARY OF THE INVENTION

The disclosure overcomes one or more of the above-discussed disadvantages, or other disadvantages, of the known mill or method of using the known mill.

According to an exemplary embodiment, there is a. method for plunge milling a workpiece. The method includes a step of rotating a cutting head while advancing the cutting head along a direction towards the workpiece; a step of removing material from the workpiece with frontal teeth disposed on a frontal face of the cutting head; a step of bending a tool holder configured to lead the cutting head inside the workpiece; a step of stopping the advancing of the cutting head along the direction towards the workpiece when the cutting head has reached a predetermined depth inside the workpiece; and a step of retrieving while rotating the cutting head from the inside of the workpiece such that side teeth of the cutting head remove material from the inside of the workpiece due to the bending of the tool holder.

According to another exemplary embodiment, there is a method for plunge milling a workpiece. The method includes a step of rotating a cutting head having frontal teeth and side teeth, a step of touching with the frontal teeth and the side teeth a portion of the workpiece for removing material from the workpiece; a step of advancing the cutting head along a Z direction of a Cartesian system of X, Y and Z axes attached to the workpiece; a step of bending a tool holder attached to the cutting head relative to the Z axis; a step of stopping the advancing of the cutting head along the Z axis towards the workpiece when the cutting head has reached a desired depth inside the workpiece; and a step of retrieving the cutting head along an opposite direction on the Z axis so that the side teeth are in contact with an inside of the workpiece for removing material from the workpiece while the front teeth are detached from the workpiece.

According to still another exemplary embodiment, there is a method for plunge milling a workpiece. The method includes a step of rotating a cutting head while advancing the cutting head along a direction towards the workpiece; a stop of removing material from the workpiece with frontal teeth disposed on a frontal face of the cutting head; a step of bending a tool holder configured to lead the cutting head inside the workpiece; a step of stopping the advancing of the cutting head along the direction towards the workpiece when the cutting head has reached a predetermined depth inside the workpiece; a step of retrieving While rotating the cutting head from the inside of the workpiece such that side teeth of the cutting head remove material from the inside of the workpiece due to the bending of the tool holder; a step of maintaining a base of the tool holder on a same axis while advancing and retrieving the cutting head; a step of bending the tool holder away from a lateral side of a hole that is being acted upon by the cutting head; and a step of acting only with the side teeth on the workpiece while retrieving the cutting head.

BRIEF DESCRIPTION OF THE DRAWINGS

The accompanying drawings, which are incorporated in and constitute a part of the specification, illustrate one or more embodiments and, together with the description, explain these embodiments. The drawings are not at scale. In the drawings:

FIGS. 1A and 1B are side and front views of a high speed steel mill;

FIG. 2 is a side view of an insert mill;

FIG. 9 is a detail, projected view of a side surface of the mill of FIG. 3 in accordance with exemplary embodiments;

FIG. 10 is a detail view of a mill taken along line D-D of FIG. 9, in accordance with exemplary embodiments;

FIG. 11 is a detail view of a mill taken along line E-E of FIG. 9 in accordance with exemplary embodiments;

FIGS. 21-23 are flowcharts of methods for plunge milling a workpiece according to exemplary embodiments.

DETAILED DESCRIPTION OF THE EXEMPLARY EMBODIMENTS OF THE INVENTION

Figure 5:
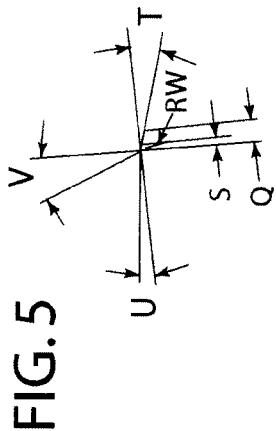
FIG. 5 is a detail view of the mill of FIG. 3, taken alone line A-A of FIG. 4, in accordance with exemplary embodiments.

The following description of exemplary embodiments refers to the accompanying drawings. The same reference characters in different drawings identify the same or similar elements. It is understood that the following detailed description does not limit the invention. Instead, the scope of the invention is defined by the appended claims.

Reference throughout the disclosure to "an exemplary embodiment," "an embodiment," or variations thereof means that a particular feature, structure, or characteristic described in connection with an embodiment is included in at least one embodiment of the subject matter disclosed. Thus, the use of the phrases "in an exemplary embodiment," "in an embodiment," or variations thereof in various places throughout the disclosure is not necessarily referring to the same embodiment. Further, the particular features, structures, or characteristics disclosed herein may be combined in any suitable manner in one or more embodiments.

Figure 4:
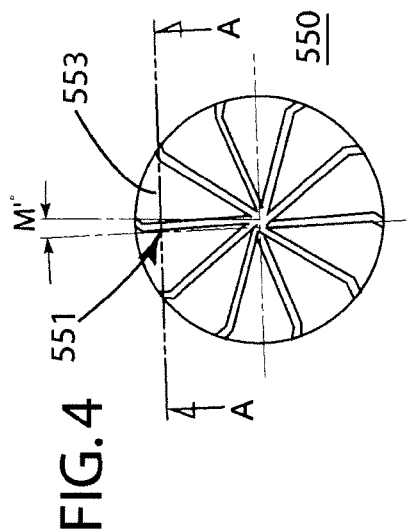
FIG. 4 is a right side view of the mill of FIG. 3 in accordance with exemplary embodiments.
Figure 3:
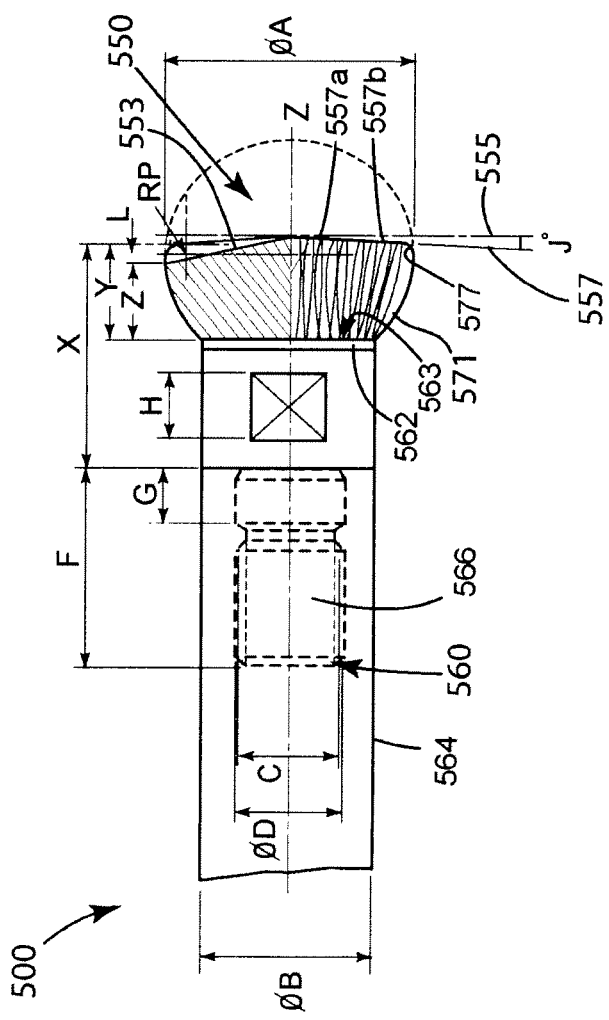
FIG. 3 is a partial cross-sectional, elevation view of a mill in accordance with exemplary embodiments.
Figures 6, 7, 8:
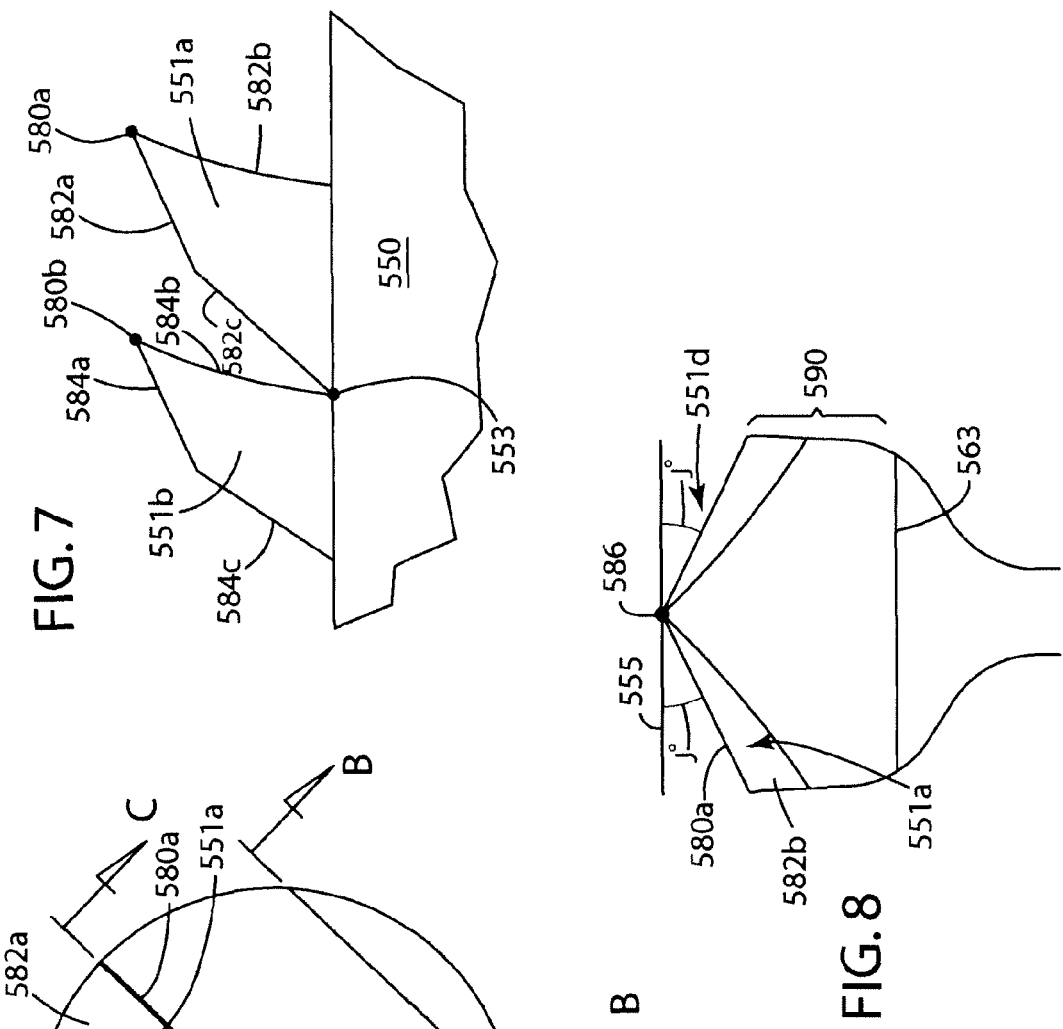
FIG. 6 is a top view of a mill in accordance with exemplary embodiments.
FIG. 7 is a detail view of a mill taken along line B-B of the mill of FIG. 6 in accordance with exemplary embodiments.
FIG. 8 is a detail view of a mill taken along line C-C of the mill of FIG. 6 in accordance with exemplary embodiments.

FIG. 3 is a partial cross-sectional, elevation view of a mill 500 in accordance with exemplary embodiments, and FIG. 4 is a right side view of the mill 500. Further, FIG. 5 is a detail view of the mill 500 which is taken alone line A-A of FIG. 4. FIGS. 6-8 shows details of the mill 500 shown in FIG. 3. FIG. 9 is a detail, projected view of a side surface of the mill 500, while FIG. 10 is a detail view of the mill 500, taken along line D-D of FIG. 9, and FIG. 11 is a detail view of the mill 500, taken along line E-E of FIG. 9.

The mill 500 can be used to perform a material removal or milling operation on a workpiece. By way of specific non-limiting example, the mill 500 can he used to perform a Z-axis plunging operation, by using a motor to rotate the mill 500 around the Z-axis and by translating the mill 500 along the Z-axis, such as during manufacture of an impeller blade of a compressor that can be used to pressurize oil or gas in an oil or a gas pipeline. It is to be understood, however, that the mill 500 can be used for other material removal, milling, or machining operations, other than on a compressor impeller blade. It is noted that the mill 500 is configured to remove material not only in front of the mill but also on side of the mill when advancing along the z-direction.

According to an exemplary embodiment, a novel mill having a head with a diameter of 25 mm, a kit length of 591 mm, and 10 teeth on the head has been compared with a traditional high speed steel (HSS) mill having 6 teeth and an insert mill having 3 teeth. The novel mill was shown to have a cutting, speed of 105 m/min., a removal material per one rotation per teeth (cutting parameter) of 0.036 mm/teeth, and a life time of 330 minutes. The HSS mill had a cutting speed of 30 m/min., a removal material per one rotation per teeth of 0.077 mm/teeth, and a life time of 180 minutes while the insert mill had a cutting speed of 120 m/min., a removal material per one rotation per teeth of 0.120 mm/teeth, and a life time of only 15 minutes. It is noted that the novel mill has a good cutting parameter and life time compared with the other mills. Also, for lengths over 600 mm of the mill, the novel mill shows reduced vibrations during rotations due to the novel geometry of the head.

According to an exemplary embodiment, Table 1A lists approximate value ranges of the dimensions of a mill 500 shown in FIGS. 3 and 4. Table 1B lists preferred, approximate value ranges of the dimensions shown in FIG. 5. Table 1C lists preferred, approximate value ranges of the dimensions shown in FIGS. 9 to 11. It is understood that the designation of "R" in the drawings indicates the presence of a radius.

TABLE 1A

| ØA (mm) | ØB (mm) | ØC (mm) | ØD (mm) | F (mm) | G (mm) | H (mm) | L (mm) | J (°) | M' (°) | P (mm) | X (mm) | Y (mm) | Z (mm) |
|---|---|---|---|---|---|---|---|---|---|---|---|---|---|
| 20-40 +0.1/−0.0 | 15.2-29 | 10.6-17 | 10-16 | 20.5-25 | 6-8 | 13-24 | 2-6 | 1-10 | 0-8 | 1-5 | 18-30 | 5-20 | 5-20 |

TABLE 1B

| Q (mm) | S (mm) | T (°) | U (°) | V (°) | W (mm) |
|---|---|---|---|---|---|
| 3-8 | 1-4 | 1-10 | 0-6 | 5-20 | 0-5 |

TABLE 1C

| d (mm) | e (mm) | F (°) | g (°) | h (°) | i (°) | l (°) | m (°) | N (mm) | o (mm) |
|---|---|---|---|---|---|---|---|---|---|
| 0.5-3 | 0-1 | 10-50 | −10-30 | 20-40 | 10-30 | 10 50 | −10-30 | 0.5-3 | 0-1 |

Dimension H indicates a size of a slot for a wrench that can be used to connect the mill 500 to a tool holder, such as a standard or known tool holder, which is connected to the motor. By this arrangement, operation of the motor results in rotation of the mill 500, such that the mill 500 can perform the above-discussed material removal operation. The tool holder may have a length longer than 30 cm. In one application, the tool holder is longer than 60 cm.

The mill 500 includes E number of top cutting teeth 551 on a top surface 553 of a cutting head 550, which is connected to a shaft 560 that extends along the Z-axis. By this arrangement, the cutting head 550, which can have a truncated spherical shape, rotates as the shaft 560 is rotated around the Z-axis. Rotation of the cutting head 550 results in the removal of material, such as from an impeller blade, by the top cutting teeth 551. As shown in the figures, in exemplary embodiments, the number E of the top cutting teeth 551 can be 10. It is to be understood, however, that the cutting head 550 can include more of less top cutting teeth.

The cutting head 550 may be integrally made with the shaft 560 or may be detachable attached to the shaft 560. For example, the cutting head 550 may be attached to the shaft 560 by various means 562, that include, for example, a magnetic mechanism, a mechanical mechanism, etc. Shaft 560 may be configured to be received by tool holder 564 as shown in FIG. 3. For example, shaft 560 may have a threaded region 566 that may be threaded inside a corresponding threaded region in the tool holder 564.

Thus, as shown and described, cutting surfaces (or edges) 557 of the top cutting teeth 551 can be disposed at an angle J relative to a reference plane 555 that is perpendicular or about perpendicular to the Z-axis, such that the cutting, surfaces 557 are disposed in an about convex arrangement as indicated in FIG. 3. Specifically, the cutting surfaces 557 can be flat cutting surfaces extending along corresponding cutting surface planes. Each of the cutting surface planes can be disposed at the angle J relative to the plane 555, which acts as a reference plane, with the angle J being measured in an about radial direction. Further, central portions 557a of the flat cutting surfaces (or edges) 557 are disposed a greater distance from a base surface 563 of the cutting head 550 along the axis Z than peripheral portions 557b of the flat cutting surfaces (or edges). In this respect, it is noted that the traditional devices have the cutting surfaces aligned with the plane 555, i.e., angle J is zero. In this embodiment, the angle J may be between 1 and 10 degrees. For a value of 3 degrees for J, the vibrations appearing in the mill during operations are minimized. In one application, the top flat cutting surface 557 and the plane 555 make an angle between 1 and 10 degrees. FIG. 4 shows 10 teeth 551 disposed on the top cutting surface 557 of the cutting head 550. The teeth 551 may be formed in various ways, as it is known by those skilled in the art.

In one exemplary embodiment, the teeth 551 may have various inclinations relative to the top cutting surface 557. The top cutting surface 557 in this exemplary embodiment may be a conical surface, a planar surface, or another spherical-like surface. For clarity, it is noted that each tooth 551 may have a combination of two or more surfaces that define the tooth and an intersection or two or more of these surfaces define cutting edges that effectively cut into the material of the workpiece. While these actual edges of the teeth 551 may have various shapes and sizes, the top cutting surface 557 refers to a surface that is determined by those cutting edges, e.g., an envelope that touches some or all of the actual cutting surfaces/edges of the teeth and this envelope is shown in FIG. 3 as element 557.

FIG. 5 represents a cutting, edge geometry on the head of the mill and shows the front clearance angle V, wedge angle U, top rake angle T, flat land S and teeth's thickness Q. Values associated with these parameters are illustrated in Table 1B.

However, according to another exemplary embodiment illustrated in FIGS. 6 and 7, the top cutting surfaces 557 of teeth 571 are reduced to edges 580 as discussed next. For simplicity, FIGS. 6 and 7 show the cutting head 550 having only two teeth 551a to 551b. Each tooth 551 has a certain spatial configuration. To define this configuration, the following surfaces and edges of a tooth 551 are introduced. A cutting edge 580a is defined by an intersection between side surfaces 582a and 582b as shown in FIG. 7. In one exemplary embodiment, the top surface 553 of the cutting head 550 may be visible between side surfaces 582c and 584b. However, in another exemplary embodiment the top surface 553 is fully covered by the teeth 551. Also, it is noted that the shape of teeth may be identical or different from each other. In still another application, the side surfaces 582a and c may form a single smooth surface or may include more than two smooth surfaces.

The view shown in FIG. 7 corresponds to a side view taken along line B-B in FIG. 6. Thus, the profile of the teeth shown in FIG. 7 is accurate for the peripheral portions 557b of the teeth 551. The profile shown in FIG. 7 may be maintained for the remainder part of the teeth 551 until the teeth 551 coalesce in a single central point 586. FIG. 8 shows another view taken along line C-C in FIG. 6. FIG. 8 shows two opposite teeth 551a and 551d, the cutting edge 580a of the tooth 551a and the side surface 582b of the same tooth 551a. FIG. 8 shows more clearly the angle J between the reference plane 555 and the cutting edge 580a of tooth 551a. In one application, each cutting edge of each tooth makes an angle substantially equal to J relative to the reference plane 550. The angles of the teeth may vary between 1 and 10 degrees. FIGS. 6 and 8 also show the base surface 563, the side region 590 and the top region 592 of the cutting head 550. As would be recognized by those skilled in the art, the various teeth are formed in the top region 592 and/or the side region 590.

The mill 500 can include side cutting teeth 571, which also may have cutting surfaces and/or edges. As shown and described, the side cutting teeth 571 can be disposed on an about spherical side surface of the cutting head 550, the side surface being between the teeth 551 and the shaft 560. The side cutting teeth 571 can include one or more side cutting edges. For simplicity, FIG. 9 shows first side cutting edges 573 and second side cutting edges 575. The first and second side cutting edges 573 and 575, sometimes respectively referred to as right and left teeth, can intersect with one another such that the side cutting teeth 571 form a number of X-shapes. The first side cutting edges 573 can include 48 teeth, and the second side cutting edges 575 can include 20 teeth. Other numbers of cutting edges are possible. Further, the cutting surfaces or edges of the side cutting teeth 571 can be curved cutting surfaces or edges. In one application, the curved cutting surface or edge of the side cutting teeth 571 is part of a sphere. It is also noted in FIG. 9 the top teeth 551. Specifically, tooth 551a with its cutting edge 580a and side surfaces 582a to c are illustrated in this figure.

FIGS. 10 and 11 illustrate cutting edge sections for lateral left and right teeth. They show the teeth front clearance angle g and m, the wedge angle f and l, the bottom fillet o and e, and the teeth's highness d and n. Values associated with these parameters are illustrated in Table 1C.

Figure 12:
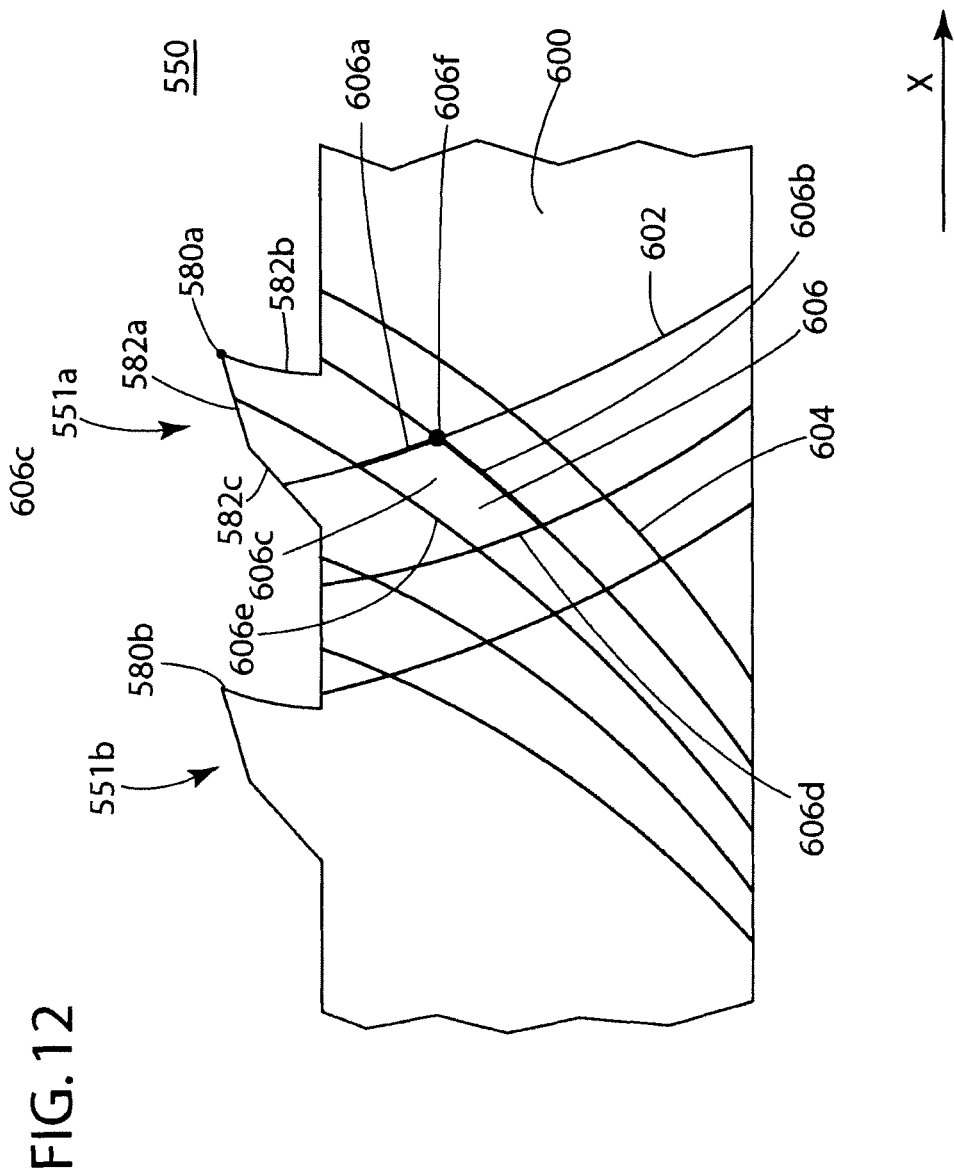
FIG. 12 is a side view of a mill according to exemplary embodiments.

According to another exemplary embodiment illustrated in FIG. 12, the side cutting teeth 571 may be formed in the following way. Assume that a side surface 600 of the cutting head 550 has a spherical shape and the side surface 600 is initially smooth (e.g., no grooves). Grooves 602 and 604 are formed in the side surface 600 to define teeth 571. A single tooth 606 is discussed next for simplicity. While FIGS. 9 to 11 show various angles and dimensions of the teeth 571, FIG. 12 shows the cutting edges of the teeth. In this respect, tooth 606 has a first cutting edge 606a defined by groove 602 and a second cutting edge 606b defined by groove 604. The sizes of the first and second cutting edges 606a and b may be the same or different. Cutting edges 606a and 606b may be straight or curved.

First and second cutting edges 606a and 606b are raised relative to a top surface 606c of the tooth 606. In a sense, tooth 606 may be seen as having a trapezoidal section, with a flat and inclined roof relative to a base of the tooth. Tooth 606 has its base formed integrally with the cutting head 550, the top surface 606c corresponding to the flat roof of the tooth having the two edges 606a and 606b higher than the other two edges of the top surface 606c with regard to the base of the tooth 606. Also, as the mill is configured to rotate from left to right in the figure, first and second edges 606a and 606b are sharpened so that they will cut into the workpiece. The other two edges 606d and 606e of the tooth 571 may either be part of the grooves 602 and 604 or may be slightly elevated from these moves.

In another application, the top surface 606c may include more or less than four edges and may include more than a single smooth surface. However, cutting edges (one or more) are common to the different embodiments. Still in another exemplary embodiment, a point 606f where cutting edges 606a and 606b intersect with each other is the highest of the top surface 606c. It is noted that the surface 606c is called a top surface with reference to the side tooth 571 and not with regard to the mill head 550.

The cutting head 550 can also include a transition portion 577 (see FIG. 3) disposed between the top cutting surface and the side surface. As already discussed above, the top cutting surface may be defined to be an envelope including plural cutting edges 580a and 580b of the top teeth 551. The transition portion 577 can be rounded, and can have a radius smaller than a radius of the side surface, such as a radius about equal to the radius P described in detail below. As shown in the figures, the side cutting teeth 571 can extend onto the transition portion 577. In alternate embodiments, the cutting teeth 571 can terminate prior to the transition portion 577.

As shown in the drawings, the mill 500 has other preferred dimensions. It is to be understood that the following, as well as the foregoing, dimensions are exemplary only, and the geometry of the mill 500 can differ from these preferred dimensions. By way of explanation of the dimensions in FIGS. 3 and 4, dimension A is a diameter of the cutting head 550, while B, C, D, F, and G are dimensions of the shaft 560 and the tool holder 564, chosen such that the mill 500 can be used with the tool holder 564.

Further, dimension Y is a maximum height of the top surface 557 (from a base surface 563 of the cutting head 550) of the top cutting teeth 551, and Z is a minimum height of the top surface 553 of the cutting head 550. Also, L is a maximum height of the top cutting teeth 551, M is an angle between a cutting edge of the top cutting teeth 551 and the radial direction, and P is a radius on an outermost radial edge of the top cutting teeth 551. Dimension X is a height to a center of the radius P.

As a result of the geometry of the mill 500, including dimensions L and A, in one application an inclination of the top surface 553 can be equal to about arcsin (L/(A/2)). Thus, in the preferred embodiments shown in the drawings, the inclination of the top surface 553 can be about 12°.

With respect to FIG. 5, dimension Q is a size of the top cutting teeth 551, measured about perpendicular to the Z-axis and about parallel to the top surface of the cutting head. S is a size of the cutting surface of the top cutting teeth 551, measured in the same direction. T is an angle of a portion or side of the cutting surface, and U is an angle of another portion or side of the cutting surface, each angle measured relative to a line that is about perpendicular to the Z-axis. V is an angle of a recessed side of the top cutting teeth 551, measured relative to a line that is about parallel to the Z-axis, while W is a radius between the recessed side of the top cutting teeth 551 and the top surface of the cutting head 550.

With respect to FIGS. 9-11, dimension d is a maximum thickness of the side cutting teeth 573, e is a radius of the side cutting teeth 573, and f and g are angles of the side cutting teeth 573. Dimension h is an angle between the side cutting teeth 573 and a line that is about parallel to the Z-axis. In a preferred embodiment, h is about 30 degrees.

Dimension i, on the other hand, is an angle between side cutting teeth 575 and the line that is about parallel to the Z-axis. In a preferred embodiment, i is about 20 degrees. Dimensions l and m are angles of the side cutting teeth 575, n is a maximum thickness of the side cutting teeth 575, and o is a radius of the side cutting teeth 575.

The mill 500 can be manufactured from various materials, and can include a coating on at least the cutting head cutting head 550. In one exemplary embodiment, the cutting head 550 is formed independent of shaft 560 and then it is attached to the shaft 560 by, for example, brazing. Exemplary materials, properties, and characteristics for the mill 500 are as follows.

Shaft 560:
Low alloyed cold work tool steel
Nominal composition, %:
C 0.95-1.10
Mn 0.25-0.45
P 0.030 max
S 0.030 max
Si 0.15-0.35
Cr 1.35-1.65
Typical properties:
Density (g/cm$^3$)>7.60
Soft annealing temperature, ° C. 740-770
Annealing hardness HB30 230
Hardening temperature, ° C. 830-860
Hardness HRc 60-64
Cutting head 550:
Tungsten-Carbide rod/grade C-2 (ISO K20/K30)
Fine grade (0.8 μm grain size)
Chemical composition: Cobalt—10%, Tungsten-Carbide—balance
Theoretical density: Approximately 0.54 lb/in$^3$ (14.8 gm/cm$^3$)
Hardness: Rockwell "A" 92.1 (Vickers-H30V=1,600)
Transverse rupture strength: 623,000 psi (4,300 N/mm$^2$)
Compressive strength: 906,250 psi (6,250 N/mm$^2$)
Welding (brazing) material between the shaft 560 and the cutting head 550
Copper-silver-copper metallic, alloy, brazing temperature ° C. 800
Coating on the cutting head 550:
Coating chemistry: Titanium aluminum nitride (TiAlN)
Composition: Single layer
Typical thickness range: 1-10 μm (0.00004-0.0004 inches)
Micro-hardness: 3600 Vickers
Temperature stability: 850° C. (1562° F.)
Coefficient of friction 0.45

The mill 500 can provide various advantages compared to a known mill. For example, deflection or vibration of the mill 500 can be minimized or eliminated during a manufacturing or material removal operation, even when the mill 500 is used over a relatively long kit length. Thus, for example, a geometry of an impeller blade manufactured by the mill 500 can be more accurate than an impeller blade manufactured by the known mill. Further or alternately, a surface finish of the impeller blade manufactured by the mill 500 can also be of a better quality than that manufactured by the known mill.

The preferred titanium aluminum nitride (TiAlN) coating can provide a high surface hardness and/or a low coefficient of friction. The TiAlN coating can result in improved ductility and is therefore well suited for interrupted cutting operations. The coating can provide superior oxidation resistance and is thus suitable for high temperature machining. The TiAlN coating may not exhibit edge brittleness and can be used for interrupted cuts without chipping.

Figure 13:
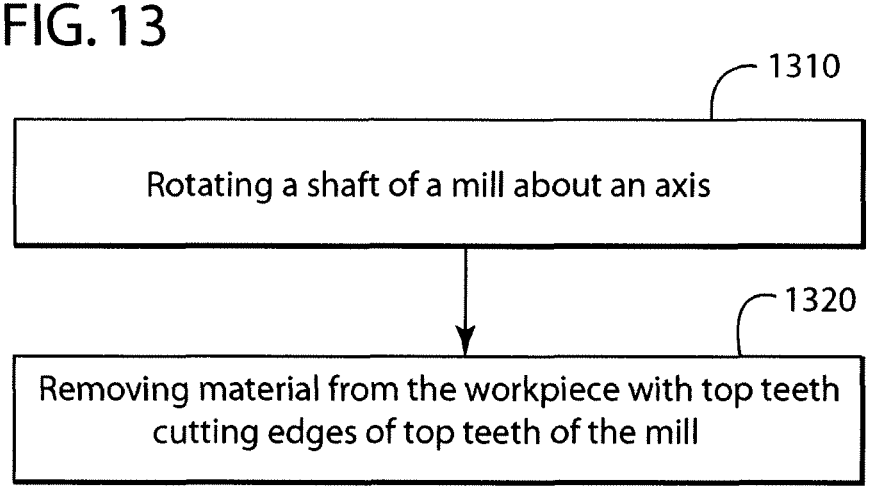
FIG. 13 is a flowchart of a method of using a mill in accordance with exemplary embodiments.

FIG. 13 is a block diagram of a method of using a mill, such as the mill 500, in accordance with exemplary embodiments. As shown in the figure, in step 1310 a shaft of a mill is rotated about an axis. In step 1320, the rotation of the shaft results in rotation of a cutting head connected to the shaft, so that material is removed from the workpiece with cutting edges of top cutting teeth of the mill. The top cutting teeth are disposed on a top surface of the cutting head, the cutting edges of the top cutting teeth being disposed at an angle relative to a plane that is perpendicular to the axis. The rotation of the shaft and the cutting head results in material being removed from the workpiece with cutting edges of side cutting teeth of the mill. The side cutting teeth are disposed on a side surface of the cutting head, the cutting edges of the side cutting teeth intersecting with one another.

Figure 14:
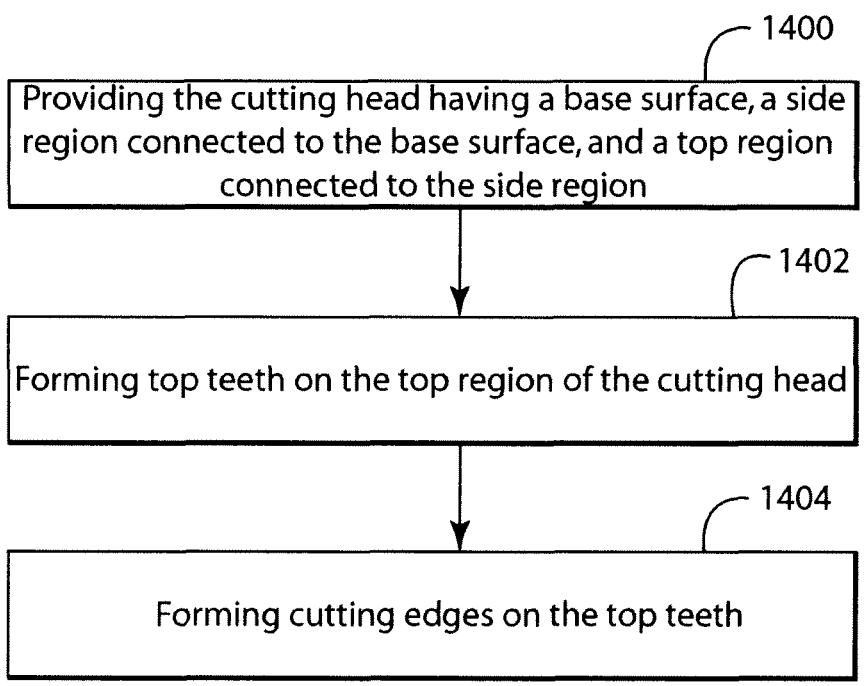
FIG. 14 is a flowchart of a method for making a mill in accordance with exemplary embodiments.

According to an exemplary embodiment illustrated in FIG. 14, there is a method for manufacturing a cutting head configured to rotate about an axis to remove material from a workpiece. The method includes a step 1400 of providing the cutting head having a base surface, a side region connected to the base surface, and a top region connected to the side region, a step 1402 of forming top teeth on the top region of the cutting head, and a step 1404 of forming cutting edges on the top teeth. The cutting edges extend from a central point of the top region towards a periphery of the top region and each cutting edge is disposed at an angle relative to a reference plane that is about perpendicular to the axis. The central portions of the cutting edges are disposed at a greater distance from a base surface along the axis than peripheral portions of the cutting edges.

Although a specific method of using the mill 500 is described above, it is to be understood that other methods of using the mill 500 are consistent with the disclosure. For example, additional, fewer, and/or other steps of using the mill 500 are consistent with the disclosure.

Figures 15, 16:
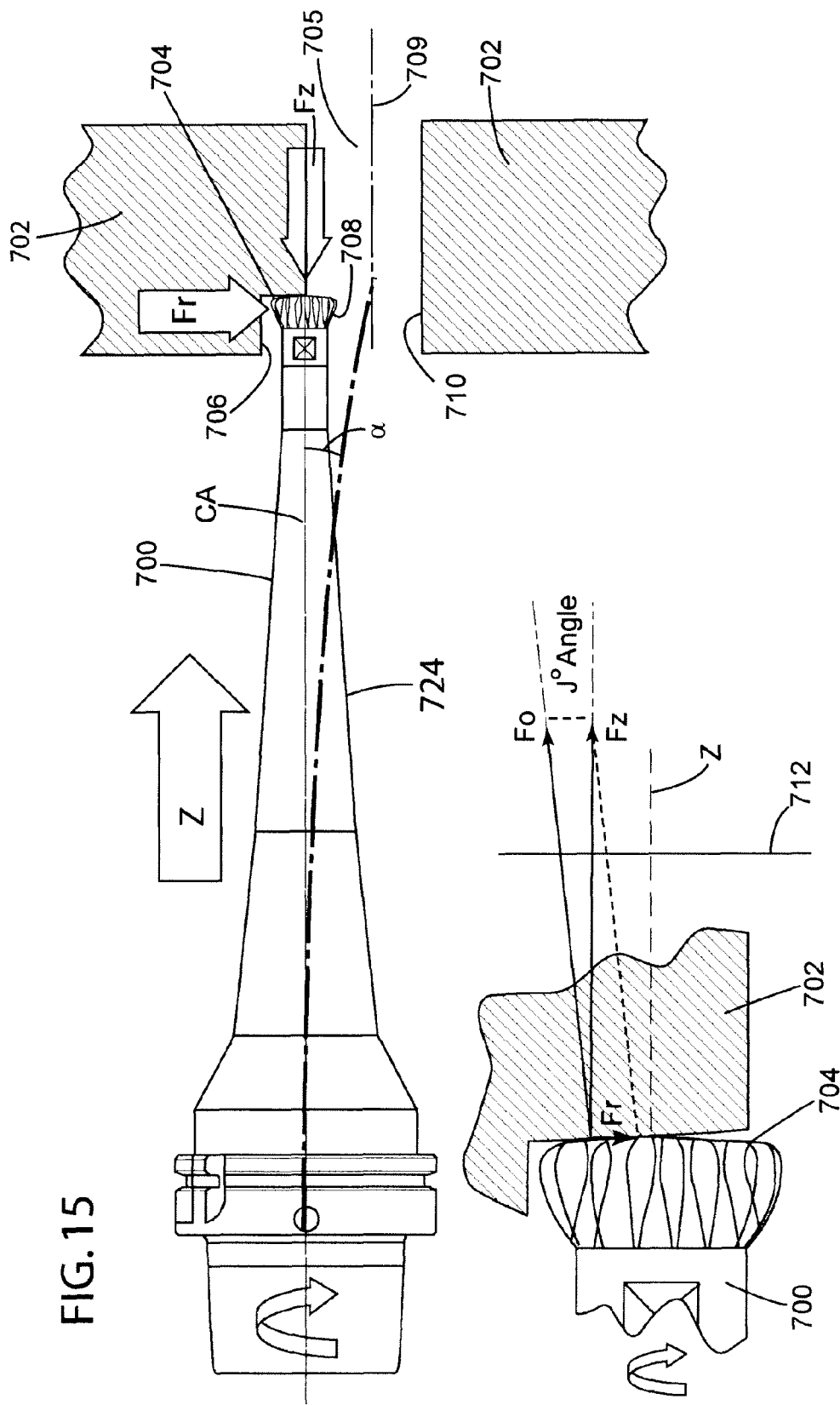
FIG. 15 is a schematic diagram of a mill advancing inside a workpiece according to an exemplary embodiment.
FIG. 16 is a schematic diagram of forces acting on the mill according to an exemplary embodiment.

A novel method for removing material from a workpiece with the novel mill shown in the previous figures is now discussed with regard to FIGS. 15-23. For a better understanding of the existing forces when performing a milling operation, FIG. 15 illustrates a novel mill 700 (for example, mill 500) that advances on a Z direction (plunge operation) in the workpiece 702. Mill 700 has frontal teeth 704 on a front surface of the mill and thus, a hole 705 is formed in the workpiece 702. In one application, mill 700 starts to remove material from a side 706 of the hole 705 and continues to extend the original hole 705 until a desired cavity is formed in the workpiece. In other words, the mill 700 is in direct contact with only a portion of the hole 705 and enlarges the hole 705 by removing material sequentially from one or more sides of the hole. However, if side teeth 708 are formed on the side of the mill 700, further material may be removed from the surface 706 while the mill 700 advances along the Z direction towards the workpiece 702.

Due to the interaction between the teeth (704 and/or 708) of the mill 700 and the workpiece 702, at least two forces are generated and these forces affect the milling process as discussed next. FIG. 15 shows an axial force Fz that is due to the interaction between the workpiece 702 and the frontal teeth 704 and this force extends along the Z axis. This force tends to oppose to the advancing motion of the mill 700 along the Z direction. Another force is the radial force Fr, which is substantially perpendicular (depends on the angle J) to the Z axis and tends to bend the mill 700 towards a centre 709 of hole 705. Due to the length of the mill 700 (kit length), the rotational speed of the mill and due to the radial force Fr which is not balanced by an opposite force, the mill 700 bends during the milling operation as shown in the figured by a deflection angle α, which defines the deviation of a central axis CA of the mill 700 along the Z axis (when no radial force is applied) from the actual central axis when force Fr is applied. It is noted that the radial force Fr is not balanced from the side 710 of the workpiece 702 as the mill 700 is used to remove only a single side 706 of the workpiece 700. The larger the deflection angle α, the larger the vibrations at which the mill 700 is exposed, and thus, the larger the probability to damage the mill.

Figure 18:
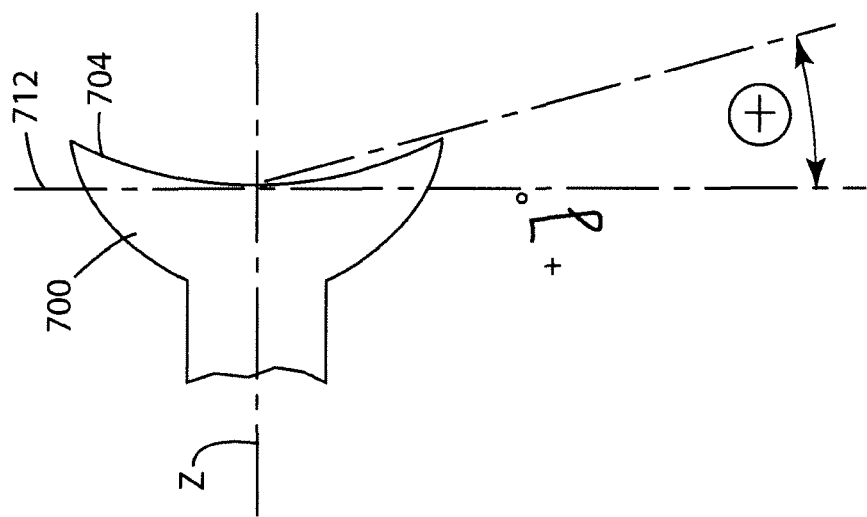
FIGS. 17 and 18 are schematic diagrams illustrating an angle of registration.
Figure 17:
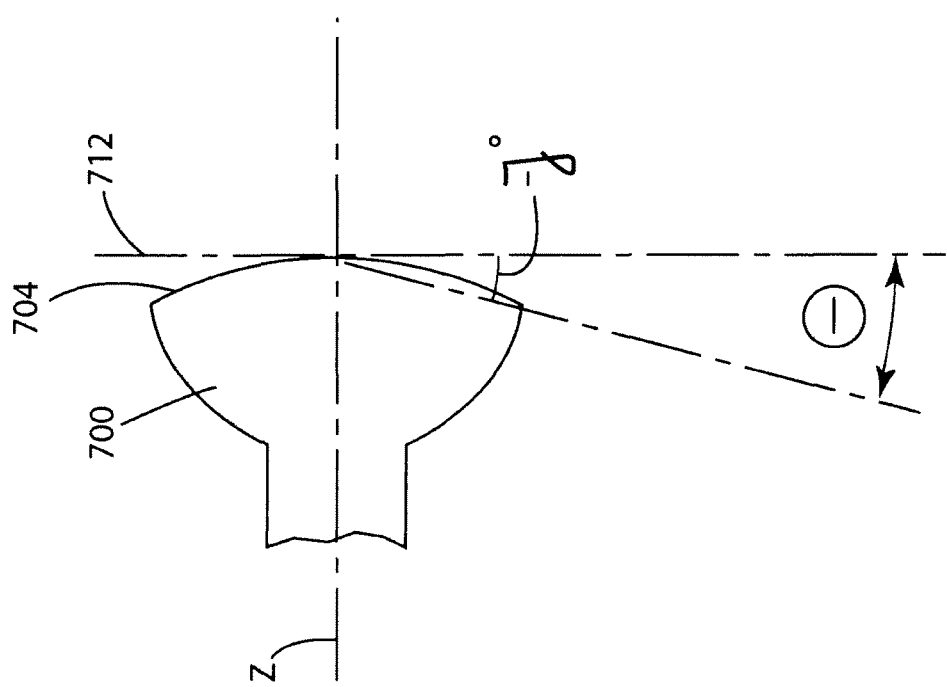

A more accurate representation of the forces that appear during plunge milling of the mill 700 is shown in FIG. 16. Radial force Fr appears for the reasons discussed above. However, this radial force also appears because the frontal teeth 704 are inclined relative to a reference plane 712 (equivalent of plane 555 in FIG. 3). The reference plane 712 is substantially perpendicular to the Z axis. The inclination of the frontal teeth 704 relative to the reference plane 712 is given by angle J, already discussed above. FIG. 17 shows that angle J (angle of registration) could be negative and FIG. 18 shows that angle J is positive. The novel mill 700 discussed in this embodiment has a negative angle and this specific shape determines the radial force to act as shown in FIG. 16.

A force that appears as a results of a direct interaction between the frontal teeth 704 and the workpiece 702 is the force $F_0$. This force is normal to the interface between the frontal teeth 704 of the mill 700 and the region to be removed of the workpiece 702. The addition of these two forces, i.e., Fr and $F_0$, determine the overall force Fz. Thus, the radial force Fr is related to the axial force Fz by the mathematical relation. Fr=Fz (tan(J)).

Figure 19:
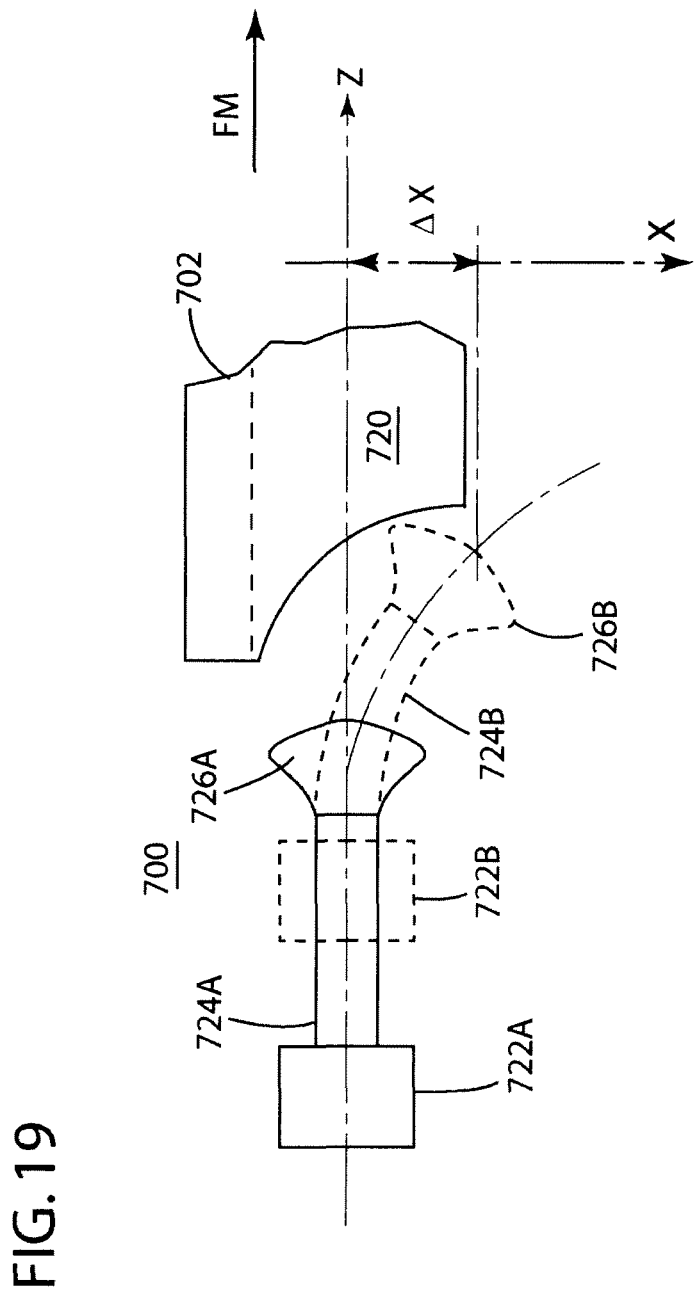
FIG. 19 is a schematic diagram illustrating a bending of as cutting head according to an exemplary embodiment.
Figure 20:
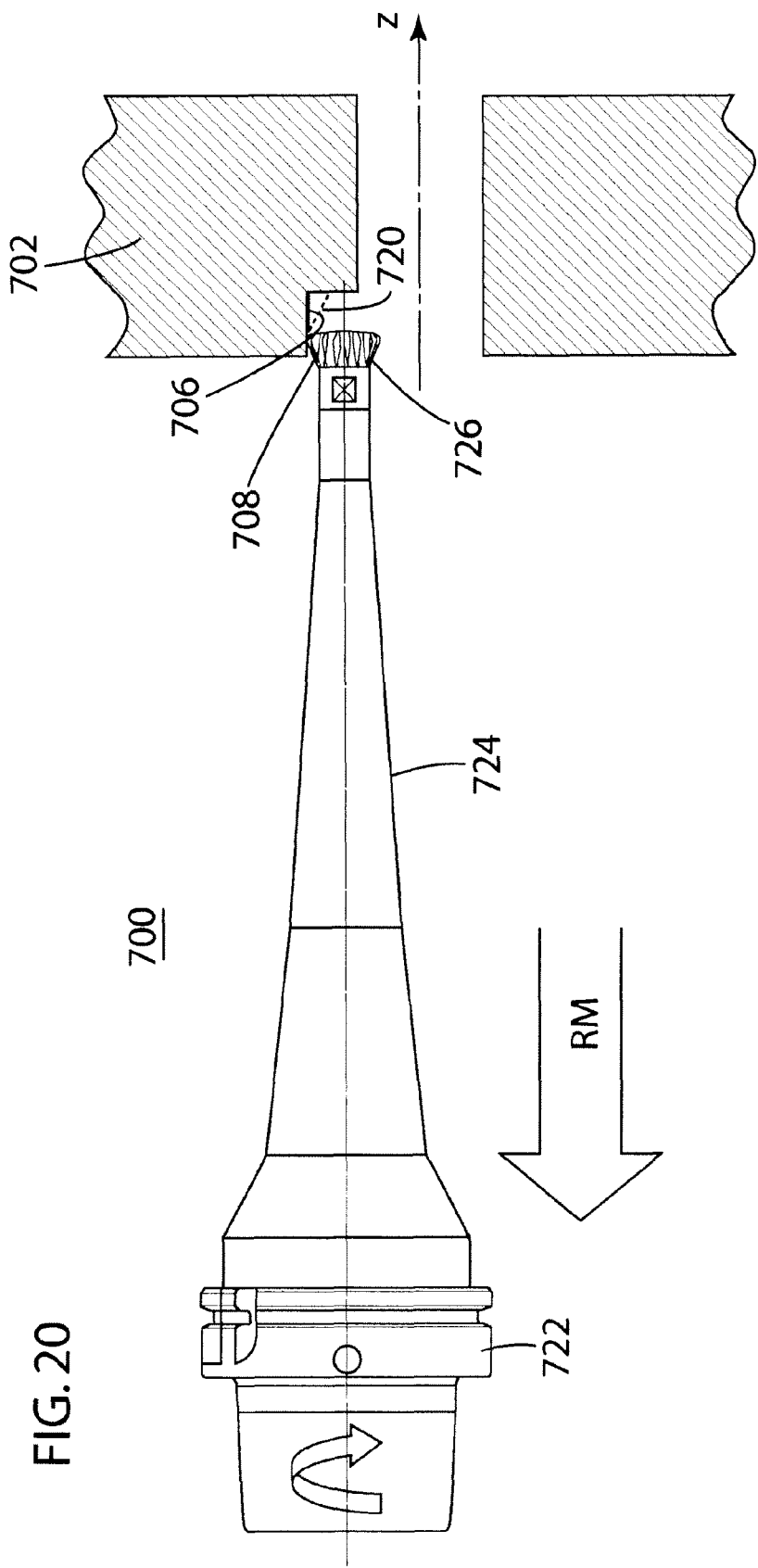
FIG. 20 is a schematic diagram illustrating a return movement of the mill according to an exemplary embodiment.

To reduce the radial force, the traditional mills have a positive angle of registration (J), which make the mill to be pushed towards face 706 (see FIG. 15) of the workpiece 702. However, the novel method discussed herein uses a negative angle of registration to have the cutting head of the mill 700 pushed away from face 706. While the radial force Fr determines the cut along the Z axis to be curved, e.g., stock 720 (see FIG. 19) is left attached to the workpiece 702 while the mill 700 advances along the +Z axis because of the deflection Δx of the axis of the mill, this apparent disadvantage is turned into an advantage as discussed next. FIG. 19 illustrates the stock 720 having an exaggerated large scale for understanding purposes. In reality, the size of stock 720 is smaller than this. Also, FIG. 19 shows the mill 700 having a base 722A, a tool holder 724A and a cutting edge 726A. As previously discussed, the cutting edge 726A is novel in the way the frontal and side teeth are disposed. Letter "A" identifies the components of the mill 700 before removing material from workpieee 702 while letter "B" identifies the components of the same mill 700 while plunge milling along +Z axis. In this final position, the tool holder 724B is shown bent and cutting edge 726B advancing not only along axis Z but also along axis X. However, it is noted that base 722A moves to position 722B without changing X and Y coordinates.

Thus, as illustrated in FIG. 19, the mill 700 executes a forward movement FM operation along a positive direction of the Z axis. On the contrary, FIG. 19 shows the mill 700 executing a return movement RM operation along a negative direction of the Z axis. In other words, after the cutting head 726 has reached a desired depth inside the workpiece 702, the mill 700 moves along RM while rotating and while lateral cutting teeth 708 remove stock 720 shown in FIG. 19 as the bending of the mill 700 persists. In this way, the backward movement (return movement) of the mill 700 is used to further remove material from the workpiece 702. In one application, after performing the forward movement, the base 722 is not moved to decrease the bending in the tool holding 724 prior to the mill performing the reverse movement so that the bending acts on side teeth 708 which act on side 706 of workpiece 702 for removing stock 720 (shown with a dashed line in FIG. 20). Thus, in one embodiment, the base 722 moves only along Z axis while executing forward movement and return movement while the same base 722 of the mill also executes X and Y in movement when the cutting head is not removing material from the workpiece.

According to an exemplary embodiment, while material is being removed from the workpiece, the base 722 moves only along Z axis while the base together with the cutting head moves in the XY plane when not removing material in order to position the cutting head for a new plunge milling operation. In other words, the cutting head is first positioned in the XY plane, then the X and Y coordinates of the base are fixed and the cutting head advances along the Z axis to remove material from the workpiece. Once the cutting head has reached a desired depth, the cutting head is retrieved along the Z axis without changing the X and Y coordinates of the base of the mill (thus the bending is present). After the cutting head is brought back to the original position, the X and Y coordinates of the base are modified for preparing the cutting head for a new Z plunge milling.

According to an exemplary embodiment illustrated in FIG. 21, there is a method for plunge milling a workpiece. The method includes a step 2100 of rotating a cutting head while advancing the cutting head along a direction towards the workpiece; a step 2102 of removing material from the workpiece with frontal teeth disposed on a frontal face of the cutting head; a step 2104 of bending a. tool holder configured to lead the cutting head inside the workpiece, a step 2106 of stopping the advancing of the cutting head along the direction towards the workpiece when the cutting head has reached a predetermined depth inside the workpiece; and a step 2108 of retrieving while rotating the cutting head from the inside of the workpiece such that side teeth of the cutting head remove material from the inside of the workpiece due to the bending of the tool holder.

According to another exemplary embodiment illustrated in FIG. 22, there is a method for plunge milling a workpiece. The method includes a step 2200 of rotating a cutting head having frontal teeth and side teeth; a step 2202 of touching, with the frontal teeth and the side teeth a portion of the workpiece for removing material from the workpiece; a step 2204 of advancing the cutting head along a Z direction of a Cartesian system of X, Y and Z axes attached to the workpiece, a step 2206 of bending a tool holder attached to the cutting head relative to the Z axis: a step 2208 of stopping the advancing of the cutting head along the Z axis towards the workpiece when the cutting head has reached a desired depth inside the workpiece; and a step 2210 of retrieving the cutting had along an opposite direction on the Z axis so that the side teeth are in contact with an inside of the workpiece for removing material from the workpiece while the front teeth are detached from the workpiece.

According to still another exemplary embodiment illustrated in FIG. 23, there is a method for plunge milling a workpiece. The method includes a step 2300 of rotating a cutting head while advancing the cutting had along a direction towards the workpiece, a step 2302 of removing material from the workpiece with frontal teeth disposed on a frontal face of the cutting head; a step 2204 of bending a tool holder configured to lead the cutting head inside the workpiece, a step 2206 of stopping the advancing of the cutting head along the direction towards the workpiece when the cutting head has reached a predetermined depth inside the workpiece; a step 2208 of retrieving while rotating the cutting head from the inside of the workpiece such that side teeth of the cutting head remove material from the inside of the workpiece due to the bending of the tool holder; a step 2210 of maintaining a base of the tool holder on a same axis while advancing and retrieving the cutting head; a step 2212 of bending the tool holder away from a lateral side of a hole that is being acted upon by the cutting head; and a step 2214 of acting only with the side teeth on the workpiece while retrieving the cutting head.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended and are understood to be within the scope of the claims.

What is claimed is:

1. A method for plunge milling a workpiece, the method comprising:
   rotating a cutting head about an axis while advancing the cutting head along a direction towards the workpiece;
   removing material from the workpiece with frontal teeth disposed on a frontal face of the cutting head;
   removing material from the workpiece with side teeth disposed on a side region of the cutting head included in a mill while the mill advances along the axis in a plunge mode, wherein the step of removing material from the workpiece with the side teeth comprises removing the material with a first set of side cutting edges disposed at a first angle relative to the axis and with a second set of side cutting edges disposed at a different, second angle relative to the axis;
   bending a tool holder configured to lead the cutting head inside the workpiece;
   stopping the advancing of the cutting head along the direction towards the workpiece when the cutting head has reached a predetermined depth inside the workpiece; and
   retrieving while rotating the cutting head from the inside of the workpiece such that the side teeth of the cutting head remove the material from the inside of the workpiece due to the bending of the tool holder.

2. The method of claim 1, further comprising:
   maintaining a base of the tool holder on the same axis while advancing and retrieving the cutting head.

3. The method of claim 1, further comprising:
   bending the tool holder away from a lateral side of a hole that is being acted upon by the cutting head.

4. The method of claim 1, further comprising:
   acting only with the side teeth on the workpiece while retrieving the cutting head.

5. The method of claim 1, wherein during plunge milling the cutting head removes the material from the workpiece only when moving along a first direction and not when moving along second and third directions, each of the second and third directions being substantially perpendicular on the first direction, and the second direction being substantially perpendicular on the third direction.

6. A method for plunge milling a workpiece, the method comprising:
rotating a cutting head about an axis having frontal teeth and side teeth;
touching with the frontal teeth and the side teeth a portion of the workpiece for removing material from the workpiece;
removing material from the workpiece with the side teeth disposed on a side region of the cutting head included in a mill while the mill advances along the axis in a plunge mode, wherein the step of removing material comprises removing the material with a first set of side cutting edges disposed at a first angle relative to the axis and with a second set of side cutting edges disposed at a different, second angle relative to the axis;
advancing the cutting head along a Z direction of a Cartesian system of X, Y, and Z axes attached to the workpiece;
bending a tool holder attached to the cutting head relative to the Z axis;
stopping the advancing of the cutting head along the Z axis towards the workpiece when the cutting head has reached a desired depth inside the workpiece; and
retrieving the cutting head along an opposite direction on the Z axis so that the side teeth are in contact with an inside of the workpiece for removing material from the workpiece while the frontal teeth are detached from the workpiece.

7. The method of claim 6, further comprising:
removing the material with the side teeth from a side of a hole formed in the workpiece while other sides of the hole are not contacted by the cutting head.

8. The method of claim 6, further comprising:
repositioning a base, connected to the cutting head via the tool holder, along the XY plane after retrieving the cutting head from the workpiece.

9. The method of claim 8, further comprising:
maintaining the base at the same X and Y coordinates while the cutting head, advances or is retrieved or is stopped in the workpiece.

10. The method of claim 6, further comprising:
forming a path inside the workpiece when advancing the cutting head, the path being curved relative to the Z axis and has a stock at a bottom of the path.

11. The method of claim 10, further comprising:
removing the stock with the side teeth when retrieving the cutting head.

12. A method for plunge milting a workpiece, the method comprising:
rotating a cutting head about an axis while advancing the cutting head along a direction towards the workpiece;
removing material from the workpiece with frontal teeth disposed on a frontal face of the cutting head;
removing material from the workpiece with side teeth disposed on a side region of the cutting head included in a mill while the mill advances along the axis in a plunge mode, wherein the step of removing material from the workpiece with the side teeth comprises removing the material with a first set of side cutting edges disposed at a first angle relative to the axis and with a second set of side cutting edges disposed at a different, second angle relative to the axis;
bending a tool holder configured to lead the cutting head inside the workpiece;
stopping the advancing of the cutting head along the direction towards the workpiece when the cutting head has reached a predetermined depth inside the workpiece;
retrieving while rotating the cutting head from the inside of the workpiece such that the side teeth of the cutting head remove the material from the inside of the workpiece due to the bending of the tool holder;
maintaining a base of the tool holder on the same axis while advancing and retrieving the cutting head;
bending the tool holder away from a lateral side of a hole that is being acted upon by the cutting head; and
acting only with the side teeth on the workpiece while retrieving the cutting head.

13. The method of claim 12, wherein during plunge milling the cutting head removes material from the workpiece only when moving along a first direction and not when moving along second and third directions, each of the second and third direction being substantially perpendicular on the first direction, and the second direction being substantially perpendicular on the third direction.

14. A cutting head configured to rotate about an axis to remove material from a workpiece, the cutting head comprising:
a base surface;
a side region connected to the base surface;
a top region connected to the side region;
top teeth disposed on the top region, the top teeth having cutting edges configured to contact the workpiece to remove material, the cutting edges extending from a central point of the top region towards a periphery of the top region and each cutting edge being disposed at an angle relative to a reference plane that is about perpendicular to the axis, wherein central portions of the cutting edges are disposed at a greater distance from the base surface along the axis than peripheral portions of the cutting edges; and
side cutting teeth disposed on the side region, wherein the side cutting teeth comprise first and second sets of side cutting edges configured to contact the workpiece to remove material, the first set of side cutting edges being disposed at a first angle relative to the axis, and the second set of side cutting edges being disposed at a different, second angle relative to the axis.

15. The cutting head according to claim 14, wherein each of the cutting edges is disposed at an angle of about 1° to 10° relative to the reference plane.

16. The cutting head according to claim 14, wherein
the first and second sets of side cutting edges are configured to contact the workpiece to remove material.

17. The cutting head according to claim 14, further comprising:
a rounded transition portion disposed between the side region and the top region.

18. The cutting head according to claim 14, wherein the first and second sets of side cutting edges are curved and are configured to contact the workpiece to remove material.

19. The cutting head according to claim 14, further comprising: a shaft configured to be attached to the base surface of the cutting head.

20. The cutting head according to claim 19, further comprising: a brazing material between the shaft and the base surface.

21. The cutting head according to claim 14, wherein a material forming the cutting head includes tungsten-carbide and cobalt.

22. The cutting head according to claim 21, wherein an amount of cobalt is substantially 10% with the remainder being tungsten-carbide.

23. The cutting head according to claim 14, further comprising: a coating layer formed over the top teeth.

24. The cutting head according to claim 23, wherein the coating layer includes titanium aluminum nitride and has a thickness range of 1-10 μm, and a coefficient of friction around 0.45.

25. A method of milling a workpiece, the method comprising:
   rotating a mill about an axis;
   removing material from the workpiece with cutting edges of top teeth of the mill, the cutting edges extending from a central point of a top region towards a periphery of the top region and each cutting edge being disposed at an angle relative to a reference plane that is about perpendicular to the axis, wherein central portions of the cutting edges are disposed at a greater distance from a base surface of the mill along the axis than peripheral portions of the cutting edges; and
   removing material from the workpiece with side teeth of the mill while the mill advances along the axis in a plunge mode, the side teeth being disposed on a side region of a cutting head of the mill, wherein the step of removing material from the workpiece with the side teeth comprises removing the material with a first set of side cutting edges disposed at a first angle relative to the axis and with a second set of side cutting edges disposed at a different, second angle relative to the axis.

26. The method according to claim 25, wherein removing material from the workpiece with the cutting edges of top teeth comprises:
   removing the material with the cutting edges, each of the cutting edge is disposed at an angle of about 1° to 10° relative to the reference plane.

27. The method according to claim 25, wherein the first set of side cutting edges is disposed at an angle of about 10°-30° degrees relative to a line about parallel to the axis and the second set of side cutting edges is disposed at an angle of about 20°-40° degrees relative to the line.

28. A method for manufacturing a cutting head configured to rotate about an axis to remove material from a workpiece, the method comprising:
   providing the cutting head having a base surface, a side region connected to the base surface, and a top region connected to the side region;
   forming top teeth on the top region of the cutting head;
   forming cutting edges on the top teeth, the cutting edges extending from a central point of the top region towards a periphery of the top region and each cutting edge being disposed at an angle relative to a reference plane that is about perpendicular to the axis, wherein central portions of the cutting edges are disposed at a greater distance from the base surface along the axis than peripheral portions of the cutting edges;
   forming side cutting teeth on the side region of the cutting head; and
   forming first and second sets of side cutting edges on the side cutting teeth, the first and second sets of side cutting edges configured to contact the workpiece to remove the material, the first set of side cutting edges being disposed at a first angle relative to the axis, and the second set of side cutting edges being disposed at a different, second angle relative to the axis.

29. The method according to claim 28, further comprising: cutting the cutting edges to be disposed at an angle of about between 1° and 10° relative to the reference plane.

30. The method according to claim 28, further comprising: attaching a shaft to the base surface of the cutting head.

31. The method according to claim 30, further comprising: providing a brazing material between the shaft and the base surface.

32. The method according to claim 28, wherein a material forming the cutting head includes tungsten-carbide and cobalt.

33. The method according to claim 32, wherein an amount of cobalt is substantially 10% with the remainder being tungsten-carbide.

34. The method according to claim 33, further comprising: applying a coating layer to the top teeth, the coating layer including titanium aluminum nitride and has a thicknesss range of 1.0 to 10 μm, and a coefficient of friction around 0.45.

* * * * *